United States Patent [19]

Bar-Yonah

[11] Patent Number: 4,519,675

[45] Date of Patent: May 28, 1985

[54] SELECTIVELY LIGHT TRANSMITTING PANEL

[76] Inventor: Yitzchak Bar-Yonah, 22 Rehov Tamar, Neve Monoson, Israel

[21] Appl. No.: 480,240

[22] Filed: Mar. 29, 1983

[30] Foreign Application Priority Data

Apr. 18, 1982 [IL] Israel ........................................ 65514

[51] Int. Cl.[3] ........................ G02B 17/00; G02B 27/00

[52] U.S. Cl. .................................... 350/259; 350/263; 350/264

[58] Field of Search .................................. 350/260-265

[56] References Cited

U.S. PATENT DOCUMENTS

| | | | |
|---|---|---|---|
| 2,812,690 | 11/1957 | Boyd | 350/262 |
| 2,812,691 | 11/1957 | Boyd | 350/260 |
| 2,858,734 | 11/1958 | Boyd | 350/260 |
| 3,255,665 | 6/1966 | Weiher et al. | 350/260 |
| 3,393,034 | 7/1968 | Imai | 350/260 |
| 3,438,699 | 4/1969 | Seeger | 350/263 |
| 3,603,670 | 9/1971 | Kim | 350/260 |
| 4,148,563 | 4/1979 | Herbert | 350/285 |

FOREIGN PATENT DOCUMENTS 1171370 12/1964 Fed. Rep. of Germany .

1318295 1/1963 France .

*Primary Examiner*—Richard A. Wintercorn

*Attorney, Agent, or Firm*—Browdy and Neimark

[57] ABSTRACT

A one layer panel which transmits rays of light incident at a range of angles of incidence while reflecting rays of light incident within a narrow range of angles of incidence, comprising a plurality of adjacent triangular prisms, the prisms having one right angle, the other two angles being such as to result in the double total internal reflection of rays incident within the narrow range of angles of incidence.

In addition, a substantially transparent panel which selectively transmits rays of light within a range of angles of incidence while reflecting rays of light incident within a narrow range of angles of incidence, comprising at least one pair of complementary one layer sheets, each comprising a plurality of adjacent right triangular prisms, the prisms having two other angles such as to result in the double total internal reflection of rays incident within the narrow range of angles of incidence, the prisms of the two sheets fitting together in a complementary relationship and being separated by an air gap.

16 Claims, 18 Drawing Figures

SELECTIVELY LIGHT TRANSMITTING PANEL

FIELD OF THE INVENTION

The present invention relates to light transmissive panels in general and, in particular, to roof panels and window panels which selectively trasmit rays of the sun which impinge thereupon at certain angles of incidence, and which reflect rays of the sun which impinge thereupon at other, predetermined, angles of incidence.

BACKGROUND OF THE INVENTION

It has long been known that the rays of the sun can be utilized to illuminate and heat the interior of a building. For this purpose, sky lights and windows are often provided. However, there are certain instances when the rays of the sun are too strong and it is therefore desired to prevent the direct rays from entering the building and to permit only indirect rays to enter to give the desired illumination without the attendant heat. A number of structures have been devised to give this desired result.

Large halls in factories, storehouses, etc., where good illumination without much heating is desired are frequently provided with so-called "saw-roof" structures. These are roofs which are formed by modular triangles which provide windows or openings which are generally directed toward the north in the northern hemisphere (south in the southern hemisphere).

Corrugated asbestos cement roofs can be provided with "Northor" elements, which project out of the surface of the roof and which are provided with a transparent wall facing the northern direction.

Devices of this nature admit only those light rays coming from one direction. They cannot and do not take into account the time of day or the time of year, both of which affect the strength of the incident rays.

In conventional protective glass, the glass is tinted or a metallic coating is layered on the glass. However, this sort of protective glass has two major disadvantages. First, the tint or metallic coating itself absorbs light and converts it into heat which is radiated inside the building. Second, the tint filters out a large portion of the light which greatly decreases the illumination within.

It has been suggested that complementary panels comprising on one side thereof prisms of uniform dimensions might be used to selectively transmit light while eliminating glare. For example, U.S. Pat. No. 3,393,034 and U.S. Pat. No. 3,603,670 each show the use of such panels or plates wherein one surface of each prism is frosted or opaque or has a reflective coating. Such panels, in addition to suffering from the defects discussed above of tinted glass, are also technically very difficult and costly to manufacture.

It has also been suggested in U.S. Pat. No. 3,438,699 to utilize an adjustable multiple slat assembly, i.e. a venetian blind, having slats which can be manually rotated as desired, each slat comprising at least two transparent pieces having intermeshing prisms. These prisms have angles of $90° \times 45° \times 45°$ in order to provide a totally reflective zone substantially only at 90°. This assembly requires constant manual adjustment during use to maintain the slat at an angle of 90° with respect to the impinging sunlight and is applicable only to planar slats.

SUMMARY OF THE INVENTION

Accordingly, it is an object of the present invention to provide light transmissive panels and window panels which overcome the disadvantages of the prior art structures discussed above.

There is thus provided in accordance with an embodiment of the present invention a one layer panel which transmits rays of light incident at a range of angles of incidence while reflecting rays of light incident within a narrow range of angles of incidence, comprising a plurality of adjacent triangular prisms, the prisms having one right angle, the other two angles being such as to result in the double total internal reflection of rays incident within the narrow range of angles of incidence.

There is further provided in accordance with an embodiment of the present invention such a one layer panel wherein the panel is a flat panel and the adjacent prisms are each of identical construction and in particular wherein the prisms have angles of 35°-90°-55°. There is still further provided in accordance with an embodiment of the present invention a curved panel of the above type wherein the prisms are parallel to the axis of curvature, and the angles of the prisms in each section of the curved panel differ so as to provide the desired total internal reflection of rays of sunlight having a given angle of incidence relative to the earth.

There is also provided in accordance with an embodiment of the present invention a venetian blind comprising a multiplicity of rotatable slats, each slat comprising a curved outward facing face comprising a panel of the above type.

It is appreciated that curved panels of any desired configuration may be provided by selection of suitable combinations of prisms having differing angular configurations.

There is additionally provided in accordance with an embodiment of the present invention a substantially transparent panel which selectively transmits rays of light within a range of angles of incidence while reflecting rays of light incident within a narrow range of angles of incidence, comprising at least one pair of complementary one layer sheets each comprising a plurality of adjacent right triangular prisms, the prisms having two other angles such as to result in the double total internal reflection of rays incident within the narrow range of angles of incidence, the prisms of the two sheets fitting together in a complementary relationship and being separated by an air gap.

There is further provided in accordance with an embodiment of the present invention a selectively transmissive panel wherein the angles of the prisms for a predetermined narrow range of angles of incidence are determined according to the following equation:

$$1.5 \sin (45-X)=\sin (90-\alpha)$$

wherein X and $90-X$ are the angles of the right triangular prisms, and $\alpha$ is the median of the narrow range of angles of incidence which results in total internal reflection.

There is still further provided such a transparent panel wherein the prisms are constructed such that one face of each prism approaches the horizontal.

There is also provided in accordance with an embodiment of the present invention such a substantially transparent panel wherein the prisms have narrow faces.

There is further provided such a substantially transparent panel wherein the two sheets are affixed to one another only at their periphery, leaving a narrow gap between them.

BRIEF DESCRIPTION OF THE DRAWINGS

The device of the present invention will be more fully understood and appreciated from the following detailed description taken in conjunction with the drawings in which.

DETAILED DESCRIPTION OF THE INVENTION

The panels of the present invention utilize the principle of double total internal reflection to selectively transmit light rays for illumination while selectively reflecting light rays which provide too much heat. The effect upon the various rays of the sun depends upon the angle of incidence of the rays upon an object. The angle of incidence, in turn, depends upon the time of day and the time of year which determine the relative position of the sun in the sky.

Figure 1:
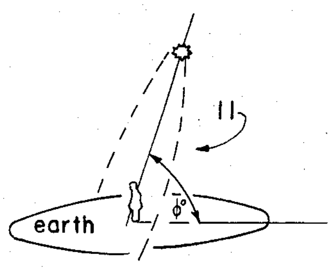
FIG. 1 is a schematic illustration of the movement of the sun in the sky.

FIG. 1 illustrates the movement of the sun in the sky, as seen by an observer. It rises in the east and defines an arc 11, setting in the west. The imaginary plane defined by this arc 11 makes an angle $\phi$ with the horizon. This angle $\phi$ depends on the geographical latitude of the place and on the month of the year. In Israel this angle is about 80° during the hot summer months, but only about 40° during the winter months of January and February.

Figure 2:
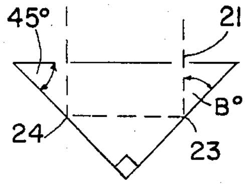
FIG. 2 illustrates total internal reflection in a 45°-90°-45° prism.

The principle of total internal reflection, illustrated in FIG. 2, has long been known in a right triangle having two equal angles. A ray of light 21 passes through surface 22 of the prism at an angle of 90° and travels through the prism until it hits surface 23 at an angle of incidence B°.

Figure 3:
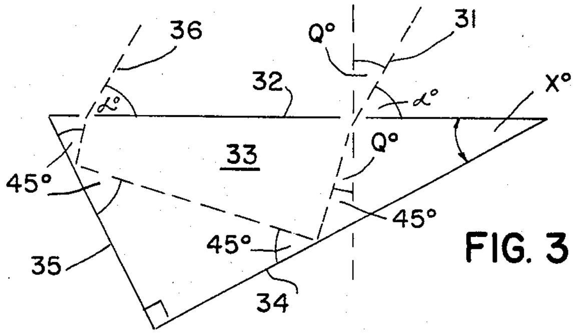
FIG. 3 illustrates total internal reflection in a prism operative in a preferred embodiment of the present invention.

Each prism, depending upon the material from which it is made and the coefficient of refraction of that material, will have a so-called critical angle with respect to each surface. This is the angle measured from the normal to the surface beyond which a ray of light will be reflected back into the prism. In glass, for example, with a coefficient of 1.5 this critical angle is 42°. Rays of light incident at angles greater than 42° from the normal depends upon the size of angle X. Likewise, a certain percentage of those rays of light incident at angles of incidence is greater than $\alpha$ and slightly smaller than $\alpha$ will be doubly totally internally reflected by the prism. The percentage of rays so reflected diminishes sharply as the difference between the angle of incidence and $\alpha$ increases. Thus, if it is desired to reflect rays falling within a narrow range of angles of incidence, the median of the narrow range may be utilized as the value of $\alpha$. In order to reflect rays of the desired angles of incidence, it is necessary to utilize a prism having appropriate angles X and 90−X. These angles may be calculated as follows. Suitable prisms will fulfill the equation $$45°+X°+(Q+90°)=180°$$

where X and Q are as shown in FIG. 3, and thus:

$$Q°=45°-X°.$$

Assuming an index of refraction of about 1.5 which corresponds to that of normal glass, according to Snell's law $$1.5 \sin Q=\sin Q'$$

Replacing Q by (45−X) and Q′ by (90−$\alpha$), one obtains $$1.5 \sin (45-X)=\sin (90-\alpha)$$

Calculations for different angles of incidence with the surface of the prism give the following values:

$\alpha$=90°; X=45°, i.e. a prism of 45-90-45°;
$\alpha$=80°; X=38.5°, i.e. a prism of 38.5-90-51.5°;
$\alpha$=70°; X=32°, i.e. a prism of 32-90-58°;
$\alpha$=60°; X=25.5°, i.e. a prism of 25.5-90-64.5°, and so forth, where $\alpha$ is the angle of incidence at which double total internal reflection occurs.

Figure 4:
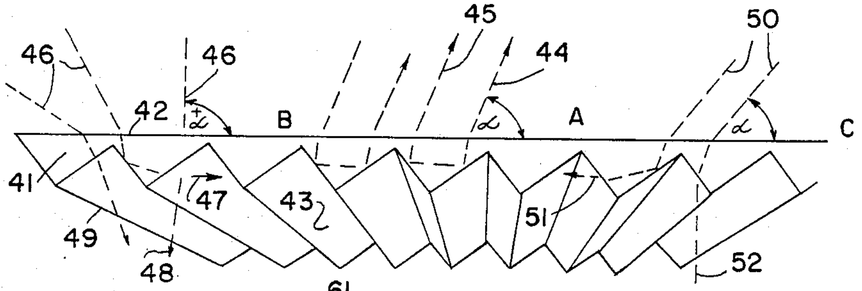
FIG. 4 illustrates the behavior of a panel of the present invention toward light having different angles of incidence.

With reference to FIG. 4 there is shown a panel 41 will be reflected. In FIG. 2, angle B is 45° so the ray is totally internally reflected from surface 23 towards surface 24. At surface 24 the ray is again incident at an angle greater than the critical angle, so it is again totally internally reflected and passes out through surface 22 of the prism on a path parallel to its path of entry.

It is appreciated that this principle of total internal reflection can also be utilized in prisms having one right angle and two unequal angles, X and 90−X, as shown in FIG. 3. Ray of light 31 is incident on surface 32 of the prism at an angle $\alpha$. It is refracted by the prism (due to the different coefficient of refraction of the prism material) so as to strike surface 34 at an angle greater than the critical angle, in this case 45°. This cause total inner reflection and the light is reflected towards surface 35 where it is again totally internally reflected and directed towards and through surface 32. At surface 32 the ray is again refracted so that ray 36 is parallel to incident ray 31. It will be appreciated that those rays which strike surface 34 at an angle greater than the critical angle but other than 45° will also be totally internally reflected. However, these rays will not leave the prism in a direction parallel to the direction of incidence. See, for example, ray 120 in FIG. 14 discussed below.

It will be recognized by those skilled in the art that not every ray which strikes the prism at angle $\alpha$ will be doubly internally reflected. A small percentage of these rays which strike surface 34 close to corner X will be reflected towards surface 32 rather than surface 35 and will, thus be reflected from surface 32 towards and through surface 35, thereby passing through the prism. The amount of such radiation which is transmitted through the prism according to the present invention, made of transparent material, provided with a smooth upper surface 42, and which comprises a plurality of parallel prisms 43 as the lower surface. Prisms 42 are selected according to the calculations above so as to transmit a broad range of incident rays but to totally reflect incident rays whose angle of incidence is centered at $\alpha$. The behaviour of rays of light of various angles of incidence can be seen with reference to rays shown at A, B and C. At A, incident ray 44 strikes the surface 42 at an angle $\alpha$, is twice internally reflected (as illustrated in FIG. 3 above) and refracted ray 45 leaves the panel at an angle $\alpha$, parallel to incident ray 44.

At B is illustrated the path of a ray incident at an angle greater than $\alpha$. Such rays are refracted within the panel but are transmitted through the prisms. For example, incident rays 46 are transmitted as refracted rays 47, 48 and 49.

At C are illustrated the paths of rays incident at angles less than $\alpha$. Such rays are also transmitted. Thus, incident rays 50 pass through the prisms as refracted rays 51 and 52.

In the embodiment illustrated in FIG. 4, all the prisms are identical so that the angles of incidence of rays to be reflected are the same for the entire panel. Since the plane defined by the orbit of the sun makes a different angle with the earth during summer as opposed to winter, it will be appreciated that the ideal prisms for this panel are those which reflect incident rays of angle $\alpha$ which is that angle which the sun makes with the earth at that location during the hottest summer months. Then, during the winter, when more heating is required and less screening is desired, the hottest rays of the sun will penetrate the panel as their angles of incidence will be less than $\alpha$ (see case C in FIG. 4). Conversely during the summer when illumination without heating is desired, the hottest rays will be reflected but the indirect light will penetrate the panel.

Figure 5:
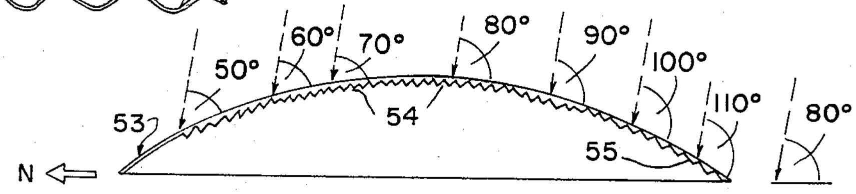
FIG. 5 illustrates a curved panel according to an embodiment of the present invention.

FIG. 5 illustrates a curved panel 53, an alternate embodiment of the panel of the present invention, which defines a segment of a spherical, parabolic or similar curved surface. Since, as shown, the angles of incidence of sunlight on various part of the curved panel 53 are different, it is necessary to utilize prisms of different angles on different sections of the panel. Again, since it is desired to reflect the hottest rays at the hottest time of the year, which in Israel means the sun is at an angle of 80° relative to the earth, the angle of incidence, $\alpha$, of those rays on the prisms in each section of the curved panel must be calculated, and from that the angles of the prisms themselves can be calculated. For example, rays coming at an angle of 80° to the earth's surface will impinge on edge 55 of curved panel 53 at an angle of incidence of 110°. Therefore, the prisms utilized on this edge must be such as to totally reflect rays for which $\alpha=110°$. Rays having angles of incidence greater or less than 110° will be transmitted through that section of the panel.

It is appreciated that the term "curved" may mean either acontinuous or discontinuous curve and thus the curved surface referred to in FIG. 5 and hereinafter may comprise a plurality of flat surfaces which are angled with respect to each other. The term "curved" will therefore be used herein in its broader sense to indicate also a surface made up of a plurality of individual flat surfaces which are angled with respect to each other.

It is further appreciated that the term "panel" as used herein may denote either a rigid or a non-rigid element as desired. Thus, flexible, foldable and otherwise selectably configurable panels are also included within the scope of the term panel.

Figure 6:
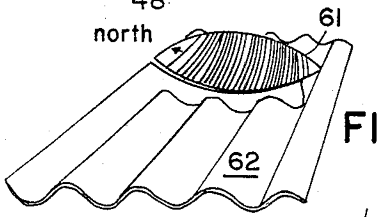
FIG. 6 illustrates a dome-shaped panel according to an embodiment of the present invention.

FIG. 6 illustrates yet another embodiment of the panel of the present invention. This is a transparent dome-shaped panel 61 located in an opening in a corrugated asbestos roof 62 forming part of the ceiling. This dome-shaped panel is also provided with a plurality of prismatic elements of different angles, as in FIG. 5, indicated by the parallel lines.

Figure 7A:
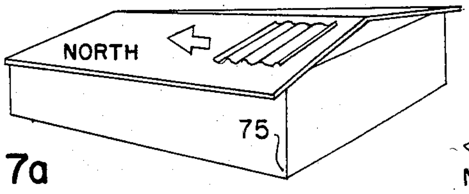
FIG. 7*a* illustrates the use of the panel of FIG. 7 on a roof.
Figure 7:
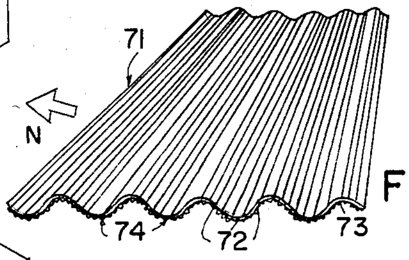
FIG. 7 illustrates a corrugated panel according to the present invention.

With reference to FIG. 7 there is shown a corrugated panel 71 according to the present invention. Corrugated panel 71 of transparent material, is provided with a plurality of triangular prisms 72 while parts of the panel, section 73, have smooth parallel surfaces. The areas 74 which are provided with prisms are those areas facing the sun. It will be appreciated by those skilled in the art that in order to function at a maximum, the panels of the present invention must be placed so that the axes of the elongated prisms are substantially in an east-west direction. Thus, the optimal placement of panel 71 in the roof of a building 75 as illustrated in FIG. *7a*.

Figure 8A:
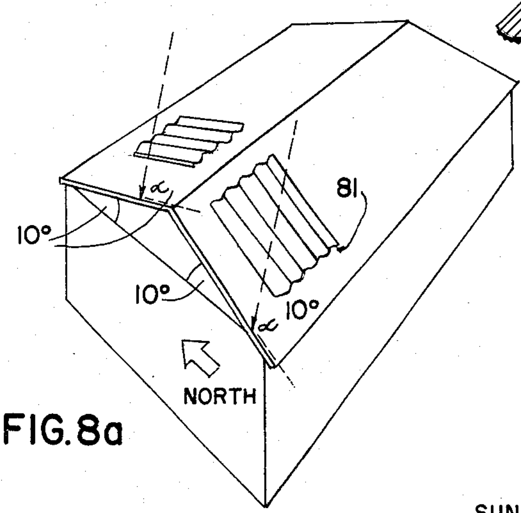
FIG. 8*a* illustrates the use of the panel of FIG. 8 on a roof.
Figure 8:
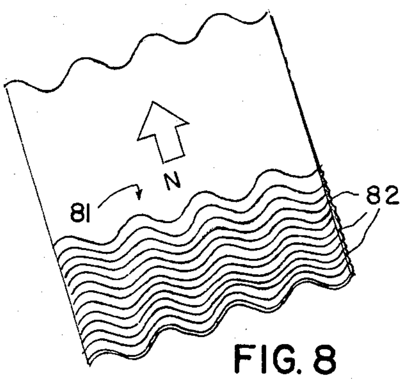
FIG. 8 illustrates an alternative embodiment of a corrugated panel according to the present invention.

FIG. 8 illustrates another embodiment of a corrugated panel 81 of the present invention. In this embodiment, as shown in the enlarged sectional view, prisms 82 are provided transversely to the corrugations rather than longitudinally. This affects the alignment of the panel and, thus, renders this suitable for use in a building which faces north as indicated in FIG. *8a*. It should be noted that in this instance, the two panels on either side of the roof require prisms of different angles, the northern facing panel requiring angles such that the reflected angle of incidence is $\alpha-10°$ while the southern facing panel requires angles such that the reflected angle of incidence is $\alpha+10°$.

Figure 9:
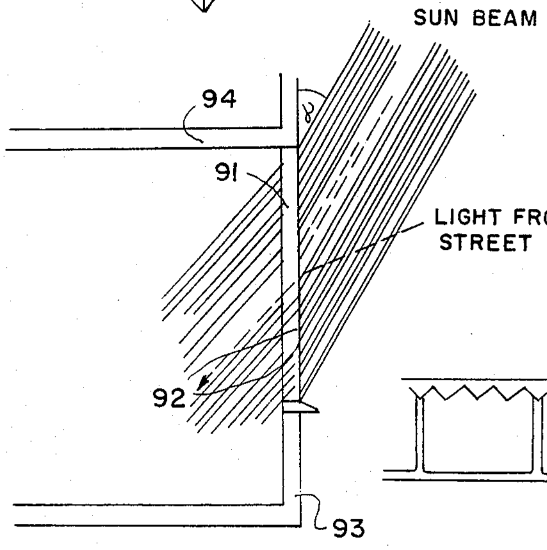
FIG. 9 illustrates the use of a panel of the present invention as part of a vertical wall.
Figure 15:
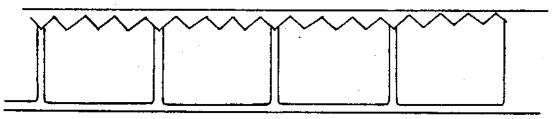
FIG. 15 illustrates a light transmissive panel defined on a Qualex ® sheet.

FIG. 9 illustrates yet another embodiment of the panel of the present invention. Here panel 91 comprising prisms 92 is mounted as part of the vertical wall 93 of a building 94. In a preferred embodiment, such a panel comprises a frame of Qualex manufactured by Polygal, Israel on the outer side of which frame the prisms are mounted. A panel constructed in such a manner is shown in FIG. 15. This is particularly suited for use as side walls or roof panels in greenhouses as it insulates as well as selectively reflecting undesirable light rays while permitting useful light rays to penetrate.

Figure 10:
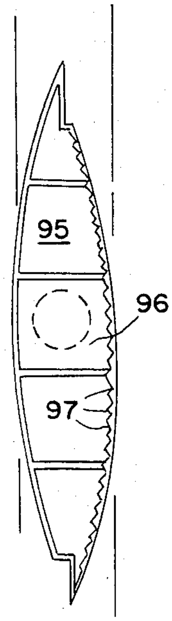
FIG. 10 is a sectional illustration of a slat panel of the venetian blind constructed and operative in accordance with an embodiment of the present invention.
Figure 11A:
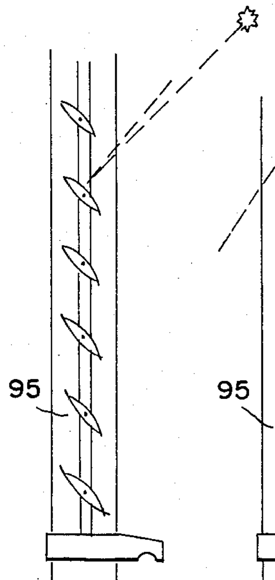
FIGS. 11*a* and 11*b* illustrate the optical properties of two alternative orientations of the venetian blind of FIG. 10.
Figure 11B:
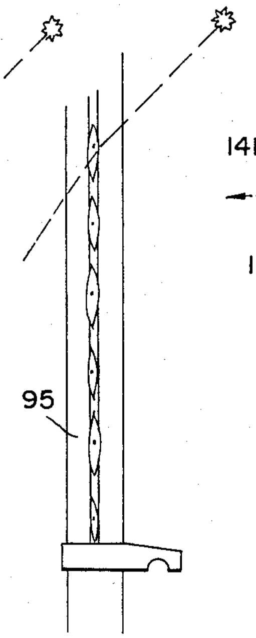

With reference to FIGS. 10, 11*a* and 11*b* there is shown a preferred embodiment of the panel of the present invention. A curved panel such as illustrated in FIG. 5 having prisms of different angles 97 on different sections thereof is utilized as the outward facing side of a conventional elliptical venetian blind slat generally designated 95 designed for rotation about pin 96. During the hot summer months, as shown in FIG. 11*a*, the blinds are opened to permit the circulation of air, but the prisms act to totally reflect the hot rays of the sun. On the other hand, during the winter months when it is desired to close the blinds as in FIG. 11*b* to retain heat within the building and to prevent entry of cold air from the outside, the prisms permit the entry of sunlight throughout the day.

Figure 12:
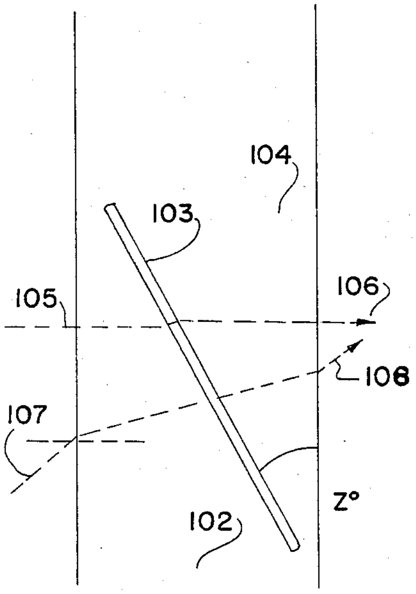
FIG. 12 illustrates light transmission through two complementary panels.

As will have been noticed, one disadvantage of the panels discussed until this point is that, while they are made of transparent material, it is not possible to see an undistorted image through them because the incident light rays are refracted in all different directions, as shown in FIG. 4. In order to seen an undistorted image, it is necessary that the transmitted light rays continue to move in the same direction as before they entered the prism. This can be achieved by the use of two panels of transparent material which have complementary surfaces, or so-called double-glazing. FIG. 12 illustrates such a construction. Panels 102 and 104 having complementary faces are placed together with a small gap 103 between them. Gap 103 may be as small as 1 micron. Incident ray 105 enters panel 102 at an angle of 90° and continues through panel 102 until it hits gap 103. There it is refracted and enters panel 104 where it is again refracted by an equal amount. It now continues through panel 104 on a path parallel to its incident path and passes out of panel 104 at an angle of 90° On the other hand, incident ray 107 enters panel 102 at an angle such that it is refracted within panel 102. It continues on its new path until it hits gap 103 where it is refracted yet again. It passes into panel 104, refracted onto a path of travel parallel to that through panel 102, and passes out of panel 104 at an angle such that it continues in a line parallel with its incident angle. When these rays reach the eye, there will be very little distortion of the image on the other side of the panels.

Figure 13:
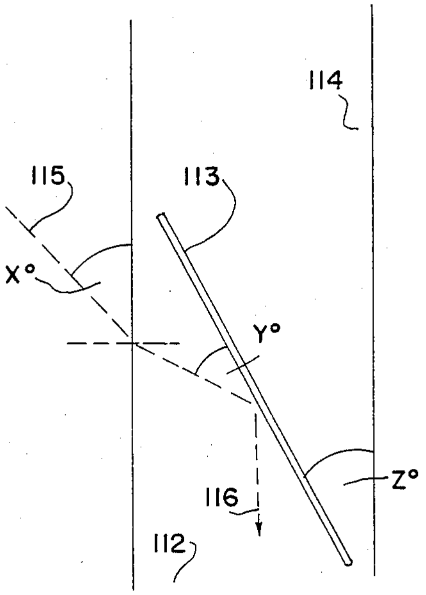
FIG. 13 illustrates total internal reflection in two complementary prisms.

FIG. 13 illustrates the phenomenon of total internal reflection in a double glazing situation. Complementary panels 112 and 114 fit together with a gap 113 between them. Incident ray 115 strikes panel 112 at an angle X such that, when it is refracted in panel 112, it strikes the gap at an angle of incidence which causes it to totally reflect internally. It will, thus, continue through panel 112 but will never enter or be transmitted through panel 114.

Figure 14:
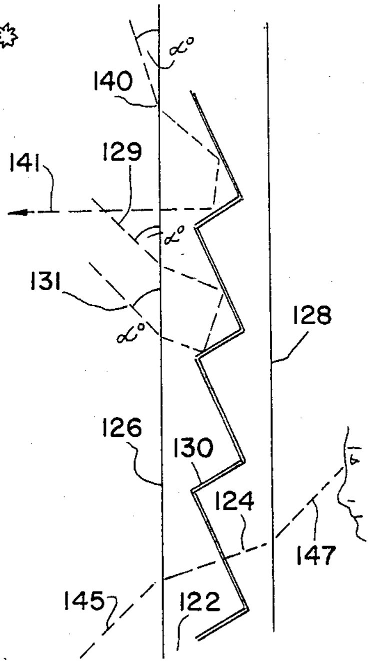
FIG. 14 illustrates light transmission and double total internal reflection as provided by the window panel of a preferred embodiment of the present invention.

FIG. 14 illustrates a window panel of the present invention comprising two complementary sheets 122 and 124, each having smooth outer surfaces 126 and 128 respectively, and comprising parallel rows of complementary prisms on their inner surfaces. Panels 122 and 124 are affixed only at their peripheral edges so as to provide a crack or gap 123 between them.

The gaps 123 may be continuous or discontinuous. The window panel may be formed of two complementary sheets as illustrated, or alternatively of a single sheet having air gaps defined therein as desired, in order to provide total internal reflection as described.

The prisms on panels 122 and 124 are uniform right triangles with their other angles calculated according to the formula given above to totally reflect incident rays of angle $\alpha$. Thus incident ray 129 enters panel 122 at an angle $\alpha$ such that, when it is refracted within the panel, it hits gap 123 at an angle of incidence greater than the critical angle. It is totally internally reflected twice by the prism, and leaves panel 122 as ray 131, parallel to incident ray 129.

A ray 140 which enters panel 122 at an angle smaller than angle $\alpha$ is totally internally reflected twice on the prism but leaves the panel as ray 141 in a different direction from its incident direction. On the other hand, a ray 145 which enters panel 122 at an angle greater than $\alpha$ is transmitted through panel 122, deflected and redeflected in gap 123 and passes through panel 124, leaving in the same direction in which it entered, providing substantially undistorted vision.

It is a particular feature of the present invention that as the prism faces become narrower and the orientation of gaps 130 approaches the horizontal, i.e. perpendicular to the plane surfaces 126 and 128, the angle $\alpha$ for which light rays are totally internally reflected by the panels rather than passing therethrough increases to about 40°, thus providing near total reflection of direct solar radiation during the hottest parts of the day. For angles greater than $\alpha$, substantially undistorted vision is provided, thus preserving uninterrupted vision in a generally horizontal or downwardly diagonal direction.

It will be appreciated that the quality of vision through the panel is improved as the size of the prisms diminishes. In other words, as the faces of the prisms become narrower, less distortion is perceived in the image. In addition, when the angles of the prisms are such that one face of the prism approaches a horizontal orientation, vision is also improved. There is, thus, provided a transparent window pane which gives complete shade, eliminating glare, without creating or transmitting heat.

Materials useful in the panels of the present invention include glass, fibreglass, polycarbonate and any other suitable transparent material having a coefficient of refraction greater than air.

It will further be appreciated that the invention is not limited to embodiments described herein, rather that the scope of the invention is defined only by the claims which follow:

I claim:

1. A generally vertically disposed window panel providing light transmissivity modulation as a function of the time of day and which selectively transmits rays of light incident at a range of angles of incidence while reflecting rays of light incident within a narrow range of angles of incidence comprising:

a prism array comprising a pluraity of adjacent triangular prisms;

said prisms having one right angle, the other two angles being such as to result in the double total internal reflection of rays incident within said narrow range of angles of incidence;

said narrow range of angles of incidence being selected from angles greater or less than 90.

2. A one layer panel according to claim 1 and wherein the panel is a flat panel and the adjacent prisms are of identical construction.

3. A one panel according to claim 2 and wherein the prisms have angles of 35°-90°-55°.

4. A panel which selectively transmits rays of light incident at a range of angles of incidence while reflecting rays of light incident within a narrow range of angles of incidence comprising:

a prism array comprising a plurality of adjacent triangular prisms formed onto a support of uniform thickness;

said prisms having one right angle, the other two angles being such as to result in the double total internal reflection of rays incident within said narrow range of angles of incidence;

said narrow range of angles of incidence being selected from angles greater or less than 90;

and wherein said panel is curved, said prisms are parallel to the axis of curvature, and the angles of the prisms in each section of the curved panel differ so as to provide the desired total internal reflection of rays of sunlight having a given angle of incidence relative to the earth, whereby light rays incident from each given sky position are reflected uniformly by said panel independent of the incident location on the panel surface.

5. A venetian blind comprising a multiplicity of rotatable slats, each said slat comprising:

a curved outward facing face comprising a one layer panel which selectively transmits rays of light incident at a range of angles of incidence while reflecting rays of light incident within a narrow range of angles of incidence, comprising:

a plurality of adjacent triangular prisms;

said prisms having one right angle, the other two angles being such as to result in the double total internal reflection of rays incident within said narrow range of angles of incidence;

said narrow range of angles of incidence being selected from angles greater or less than 90;

said panel being curved, said prisms being parallel to the axis of curvature and the angles of the prisms in each section of the curved panel differing so as to provide the desired total internal reflection of rays of sunlight having a given angle of incidence relative to the earth.

6. A one layer panel according to claim 4 and wherein the panel is in the form of a corrugated panel.

7. A substantially transparent panel which selectively transmits rays of light within a range of angles of incidence while reflecting rays of light incident within a narrow range of angles of incidence comprising:

light transmissive sheet means having formed therein an array of gaps which define a pair of facing arrays of prisms which are separated at said gaps, each array comprising:

a plurality of right triangular prisms, said prisms having two other non-equal predetermined angles such as to result in the double total internal reflection of rays incident within the narrow range of angles of incidence;

the prisms of each pair of facing arrays fitting together in a complementary relationship;

no reflecting coating being interposed between said pair of facing arrays of prisms at said array of gaps.

8. A substantially transparent panel according to claim 7 and wherein said light transmissive sheet means comprises a single sheet having formed therein said array of gaps.

9. A substantially transparent panel according to claim 7 and wherein said light transmissive sheet means comprises a pair of sheets, each having formed thereon an array of prisms.

10. A substantially transparent panel according to claim 7 and wherein said array of gaps defines a continuous gap.

11. A substantially transparent panel according to claim 7 and wherein said array of gaps defines a plurality of gaps separated from each other.

12. A substantially transparent panel according to claim 7 and wherein said plurality of prisms are oriented such that one face of each prism approaches the horizontal.

13. A substantially transparent panel according to claim 7 and wherein adjacent prisms have narrow faces.

14. A substantially transparent panel according to claim 9 and wherein said pair of sheets are affixed to one another only at their periphery.

15. A selectively transmissive panel according to claim 1 and wherein the angles of the prisms for a predetermined narrow range of angles of incidence are determined according to the following equation:

$$1.5 \sin (45 - X) = \sin (90 - \alpha)$$

wherein X and 90−X are the angles of the right triangular prisms and $\alpha$ is the median of the range of angles of incidence which are totally internally reflected.

16. A selectively transmissive panel according to claim 7 and wherein the angles of the prisms for a predetermined narrow range of angles of incidence are determined according to the following equation:

$$1.5 \sin (45 - X) = \sin (90 - \alpha)$$

wherein X and 90−X are the angles of the right triangular prisms and $\alpha$ is the median of the range of angles of incidence which are totally internally reflected.

* * * * *